(No Model.)

S. ELLIOTT.
FLEXIBLE TIRED WHEEL.

No. 527,782. Patented Oct. 23, 1894.

Witnesses:
John Buckler,
E. M. Taylor.

Inventor:
Sterling Elliott
By Redding & Kiddle
Attorneys.

UNITED STATES PATENT OFFICE.

STERLING ELLIOTT, OF NEWTON, MASSACHUSETTS, ASSIGNOR TO THE POPE MANUFACTURING COMPANY, OF PORTLAND, MAINE, AND HARTFORD, CONNECTICUT.

FLEXIBLE-TIRED WHEEL.

SPECIFICATION forming part of Letters Patent No. 527,782, dated October 23, 1894.

Application filed January 8, 1894. Serial No. 496,054. (No model.)

*To all whom it may concern:*

Be it known that I, STERLING ELLIOTT, a citizen of the United States, and a resident of Newton, county of Middlesex, State of Massachusetts, have invented certain new and useful Improvements in Flexible-Tired Wheels, of which the following is a specification, reference being had to the accompanying drawings, forming part hereof.

This invention relates to flexible tires for wheels and to the rims and means for attaching the tires to the rims.

The invention is especially adapted for use on bicycles or similar vehicles.

One of the objects of this invention is to provide for rapid attachment and removal of the tire for purposes of repair or replacement.

Another object is to provide for rapid insertion and removal of the inner tube of a tire having an outer sheath or cover and an inner inflatable tube.

Other objects are to provide a tire that will be firmly held in position and will not creep upon the rim and will hold together when deflated and may be used in an emergency when deflated, and will be of simple construction and strong and durable.

Figure 1:
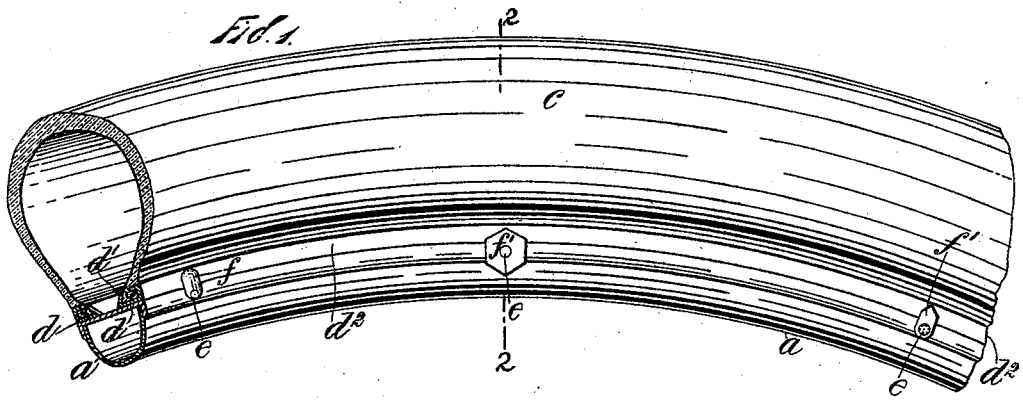
Figure 2:
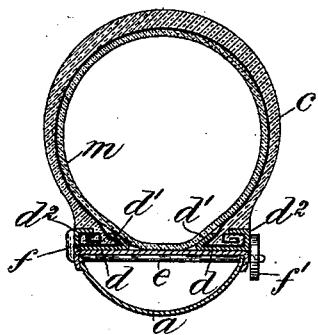

In the accompanying drawings Figure 1 is a side elevation showing a portion of a tire and rim and retaining devices embodying my invention. Fig. 2 is a transverse section of the same on the line 2—2.

In the embodiment of my invention shown the rim $a$ is made up of two plates of metal rolled up into desired form with overlapping edges, and the outer surface or periphery of this rim is of cylindrical form, that is to say, it is a curved flat surface or a surface the development of which is a flat surface, and which is therefore frequently referred to as a flat surface, while its inner periphery is suitably rounded or may be otherwise shaped as desired. The cylindrical shape of this outer periphery of the rim $a$ may be to some extent departed from, and the rim may be made of wood or similar material.

The tire in the embodiment of my invention shown in the drawings comprises an outer flexible sheath or cover $c$ and an inner inflatable tube $m$. The inner tube is of ordinary construction and therefore need not be particularly described and is shown only in Fig. 2. The flexible tire sheath or cover $c$ is provided with circumferentially inextensible portions or edges mounted upon the cylindrical outer periphery of the rim $a$. These circumferentially inextensible bands $d$ are made of suitable metal and are so shaped as to cover and incase the edges of the cover or sheath, and these edges of the cover or sheath are made strong and hard by wrapping them with a canvas reinforce, by vulcanizing or otherwise. The metal band $d$ is made with the inner lip $d'$ extending at right angles to the adjacent part of said band, or otherwise so that the edge of the cover or sheath may be readily inserted within the band. After the edge has been inserted the lip $d'$ is forced over upon the edge by a suitable roller or otherwise into the oblique position shown. This construction permits the cover or sheath to be molded and vulcanized before attaching the inextensible edges or bands, and with this construction the operation of attaching and uniting these bands or edges may be readily and quickly performed. It also has the advantage that metallic bearing surfaces, to wit, the outer surfaces $d^2$ of the bands $d$ are provided for the fastening devices.

The reinforced inextensible edges of the sheath are shown as of a total width narrower than the width of the rim so that the inner tube will rest medially upon the rim, and in other portions upon the inextensible edges or bands $d$ $d$, but they may in some constructions be wide enough to cover the entire width of the rim.

The fastening devices for securing the tire to the rim need only provide for lateral movement of the rim as the inextensible character of the bands or edges prevents radial outward movement or circumferential enlargement of the parts of the tire mounted upon the rim. The fastening or retaining devices shown in the drawings comprise the rod $e$ transversely mounted in the rim and preferably inserted through a hole in the rim and having a hook $f$ formed at one end thereof, and a nut or button $f'$ mounted upon the other end. In Fig. 1 the left hand fastening device shows the hook $f$, the middle fastening device shows a hexagonal nut $f'$ and the right hand fastening device shows an elongated button or nut $f'$. The nut $f'$ may be screwed upon the end of the rod $e$, or may be riveted or otherwise held thereon, and the rod $e$ is pivotally mounted so that the hook $f$ can be turned up as shown to engage with the edge or band $d$ of the cover or sheath and turned down to disengage the same, while the nut $f'$ when elongated may be turned with the rod or independently of the rod into and out of engaging position, and when shaped as an ordinary nut may be screwed on or off the end of the rod to move it into and out of engaging position, as desired.

The pressure of the confined air in the tire will tend to move laterally outward the edges or bands $d$ and will thus cause a pressure upon the retaining devices which holds the parts securely in place and prevents any creeping of the tire circumferentially around the rim. In the event of accidental deflation of the tire while the vehicle is on the road the parts will be held in place by the friction of the bands or edges $d$ upon the rim as well as that between the fastening devices and the bands or edges $d$, and the tire may be used in such an emergency without injury and will not creep upon the rim.

When it is desired to remove or have access to the inner tube or for other reason one or both edges of the sheath are to be removed from the rim, the inner tube is partially or wholly deflated so that the lateral pressure upon the retaining devices is relieved and then the retaining devices are moved out of engagement with the edges of the sheath. One or both of these edges may then be moved off the rim, and if they do not come off freely they may be pushed off by a slight inflation of the inner tube. As access may be had to the inner tube by the removal of but one of the edges of the cover or sheath, it is evident that in some constructions the other edge may be permanently secured to the rim or held in any suitable manner, and may or may not be inextensible as desired.

I do not limit my invention to the specific constructions shown; but

What I claim, and desire to secure by Letters Patent, is—

1. In a wheel, the combination of a rim, a flexible cover or sheath, and an inner inflatable tube, said cover or sheath being opened circumferentially and provided with circumferentially inextensible bands of metal or similar material secured to and inclosing its edges, and said metal incased edges of the cover or sheath being supported upon the rim, and pivoted retaining devices located in different fixed positions around the rim and adapted to engage with said metal incased edges of the cover or sheath to hold the same from moving laterally off the rim, substantially as set forth.

2. In a wheel the combination with a flexible tire cover or sheath opened circumferentially, and having an enlarged edge of a circumferentially inextensible band of metal or similar material attached to and inclosing the enlarged edge of said sheath, said band having an inner lip forced over upon the inclosed edge of the cover or sheath and having an outer part adapted to engage with suitable fastening devices, substantially as set forth.

3. In a wheel the combination of a rim and a flexible cover or sheath, said cover or sheath being opened circumferentially, and having enlarged edges and circumferentially inextensible bands of metal or similar material attached to and inclosing the enlarged edges of said cover or sheath, said bands having inner lips forced over upon the inclosed edges of the cover or sheath and having outer parts adapted to engage with the fastening devices, and said bands being supported upon the rim, and suitable fastening devices adapted to engage with said bands and rim to hold the edges of the cover or sheath from moving laterally off the rim, substantially as set forth.

4. In a wheel the combination of a rim, a flexible cover or sheath and an inner inflatable tube, said cover or sheath being opened circumferentially, and circumferentially inextensible bands of metal or similar material attached to and inclosing the edges of said cover or sheath, said bands having inner lips forced over upon the inclosed edges and having outer parts adapted to engage with the fastening devices, and said bands being supported upon the rim, and fastening devices comprising pivoted latches mounted on the rim and adapted in one position to engage with said metal band or bands to hold the edge or edges of the cover or sheath from moving laterally off the rim and to be moved out of said position to permit the separation of said parts, substantially as set forth.

This specification signed and witnessed this 5th day of January, 1894.

STERLING ELLIOTT.

In presence of—
W. H. FRANKLAND,
FRED L. OAKS.